United States Patent [19]

Beseke et al.

[11] 4,208,631
[45] Jun. 17, 1980

[54] DIGITAL PULSED DC REMOTE-CONTROL SYSTEM

[75] Inventors: Kermit M. Beseke, Schaumburg; James E. Hoffmann, Palatine, both of Ill.; Ronald J. Kopecki, Boulder, Colo.

[73] Assignee: Motorola, Inc., Schaumburg, Ill.

[21] Appl. No.: 918,549

[22] Filed: Jun. 23, 1978

[51] Int. Cl.² .............................................. H04Q 5/16
[52] U.S. Cl. .................................. 455/92; 340/147 C
[58] Field of Search ....................... 325/183; 179/2 A; 340/147 C

[56] References Cited

U.S. PATENT DOCUMENTS

| 2,726,377 | 12/1955 | Hammer | 179/2 A |
| 3,384,713 | 5/1968 | Duncan | 179/2 A |
| 3,577,080 | 5/1971 | Cannalte | 325/183 |
| 3,597,543 | 8/1971 | Mallebrein | 179/2 A |

OTHER PUBLICATIONS

*Radio*, Oct. 1938; "Dial Phone Remote Control," by George M. Grening; pp. 24–29 & 76.

*Primary Examiner*—David L. Stewart
*Attorney, Agent, or Firm*—Rolland R. Hackbart; James W. Gillman

[57] ABSTRACT

A remote control system and method therefor is disclosed that includes a control station coupled by a two-wire line to a base station having a transmitter for providing simplex radio communications to mobile radios. The control station utilizes digital pulsed DC signalling to select a radio channel of the base-station transmitter for transmission of each message. In response to activation of a transmission switch, the control station applies a DC voltage to the two-wire line and thereafter applies a command pulse train having a predetermined number of pulses corresponding to the selected radio channel. The base station is responsive to the DC voltage on the two-wire line for receiving the command pulse train. The pulses in the received command pulse train are totalized, and the base station transmits the message on the radio channel corresponding to the totalized number of pulses.

13 Claims, 8 Drawing Figures

DIGITAL PULSED DC REMOTE-CONTROL SYSTEM

BACKGROUND OF THE INVENTION

1. Field of the Invention

The present invention relates to a remote control system, and more particularly, to an improved remote control system for controlling the operation of a base station having a transmitter operable on a plurality of radio channels.

2. Description of the Prior Art

Remote control systems for a base station have typically been architectured according to one of the following three configurations. First, a local control configuration may be provided by merely separating by a few feet a control station from a base station and providing a rather large amount of electrical interconnections. Due to the complexity and susceptibility to interference of the electrical interconnections, the control station may not be much further than 100 feet from the base station in the local control configuration.

Secondly, a direct-current control configuration may be provided where a control station applies predetermined amounts of current to a wire line for controlling various functions of a base station. The direct-current control configuration is limited to a range of approximately twenty miles simply because of the resistance of the wire line and the current levels necessary for operation. In addition, the direct-current configuration necessitates relatively large DC voltages to maintain the predetermined amounts of current in long wire lines having high loop resistances.

Finally, a tone control configuration may be provided where a control station applies different tones to a wire line for controlling the various functions of the base station. The tone control configuration, as illustrated in U.S. Pat. No. 3,577,080, can reliably operate over great distances, for example, the control station and the base station may be separated by several hundred miles. However, the tone control configuration necessitates relatively complex and costly control circuitry.

In all three of the foregoing configurations, multiple control units cannot be accommodated or added without substantial and costly redesign. Neither the direct-current control configuration nor the local control configuration provides a relatively inexpensive remote control system that has both the capacity to control many functions and a range of up to several miles.

For the foregoing and other shortcomings and problems, there has been a long felt need for an improved remote control system for controlling the operation of a remote base station.

SUMMARY OF THE INVENTION

Accordingly, it is a general object of the present invention to provide an improved remote control system utilizing digital pulsed DC signalling for controlling from a remote control station the operation of a base station having a transmitter operable on a plurality of radio channels.

It is another object of the present invention to provide an improved remote control system utilizing digital pulsed DC signalling for controlling from a remote control station the operation of a base station having a transmitter operable on a plurality of channels, where the digital pulsed DC signalling utilizes relative low DC voltages and is not polarity sensitive.

It is a further object of the present invention to provide an improved remote control system utilizing digital pulsed DC signalling for controlling from a plurality of non-contiguous remote control stations the operation of a base station having a transmitter operable on a plurality of radio channels, where each control station is individually capable of controlling the operation of the base station.

It is yet a further object of the present invention to provide an improved remote control system utilizing digital pulsed DC signalling for controlling from a remote control station the operation of a base station having a transmitter operable on a plurality of radio channels, where the base station acknowledges each command from the control station.

In practicing the invention, a remote control system utilizing digital pulsed DC signalling includes a control station connected via a wire line to a base station. The base station has a transmitter operable on a plurality of radio channels. The control station further includes a plurality of channel switches, each channel switch corresponding to a pre-established radio channel of the base station. A selected channel switch is activated prior to sending a message from the control station. Activation of a transmission switch initiates the message and enables a pulse generator to provide a command pulse train at a predetermined frequency and having a predetermined number of pulses corresponding to the selected channel switch. First wire-line interface circuitry is responsive to the activation of the transmission switch for applying a DC voltage to the wire line and thereafter applying the command pulse train from the pulse generator to the wire line.

At the base station, second wire-line interface circuitry senses the DC voltage on, and receives the command pulse train from, the wire line. A counter is responsive to the sensed DC voltage for totalizing the pulses of the received command pulse train. Control circuitry enables the base station to transmit the message on the radio channel corresponding to the totalized number of pulses of the received command pulse train.

Additional features, objects and advantages of the present invention will be more clearly apprehended from the following detailed description together with the accompanying drawings.

BREIF DESCRIPTION OF THE DRAWINGS

FIG. 8 shows a functional block digram of a decoder embodying an acknowledge signalling feature.

DESCRIPTION OF THE PREFERRED EMBODIMENT

Figures 1, 3:
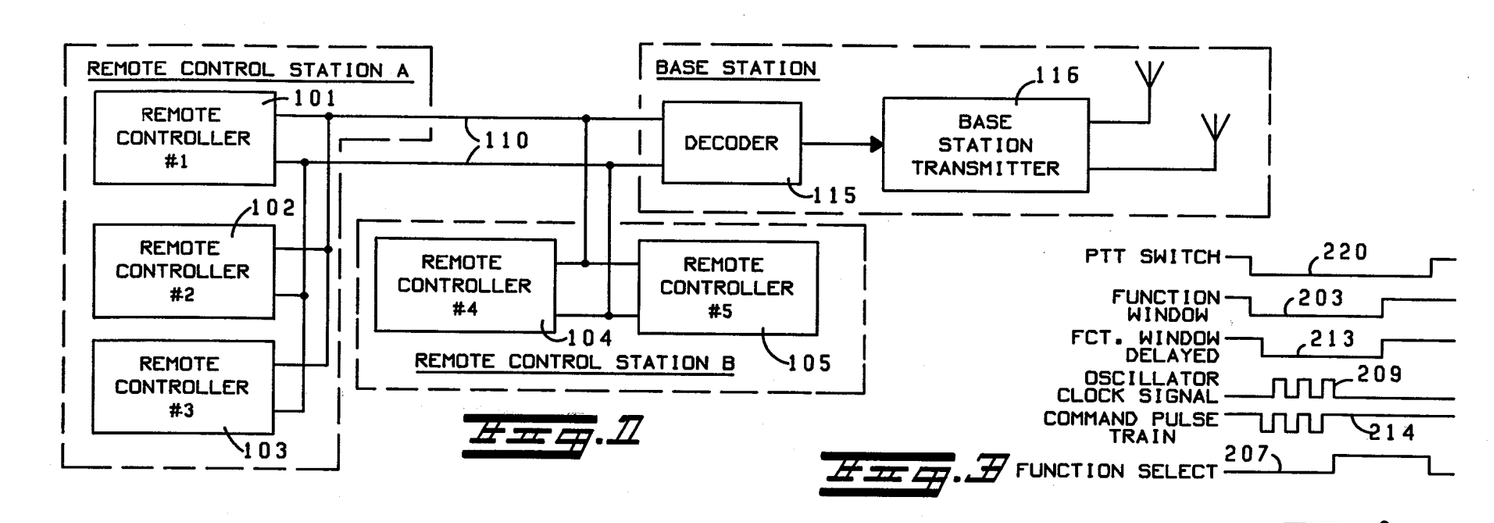
FIG. 1 illustrates a remote control system embodying the present invention.
FIG. 3 shows a timing diagram of waveforms for corresponding blocks of the controller of the FIG. 2.

In FIG. 1, there is illustrated a remote control system that utilizes digital pulsed DC signalling for controlling the operation of a base station. Remote controllers 101-105 are located in non-contiguous remote control stations A and B. For example, remote controllers 101-103 may be located on different floors of a building situated at remote control station A. Likewise, in a second building situated a mile away from remote control station A at remote control station B, remote controllers 104 and 105 may be located in different rooms on same floor of the second building. The remote controllers 101-105 are connected in parallel via the wire line 110 to decoder 115 of the base station. The wire line 110 may be a twisted pair of wires. Utilizing twisted pair for the wire line 110 allows the control station to be located up to three miles from the base station.

The decoder 115 is connected to a of base station transmitter 116 operable on a plurality of radio channels. The decoder 115 is responsive to the digital pulsed DC signalling from the remote controllers 101-105 for controlling the operation of the base-station transmitter 116.

Messages from the remote controllers 101-105 to mobile radios are sent via the wire line 110 to the base-station decoder 115 for transmission on a selected radio channel of the transmitter 116. The base and mobile radios may be of the simplex type, although the present invention may also be advantageously utilized with duplex radios. After transmission of the message, the base station continues to monitor the selected radio channel.

Figure 2:
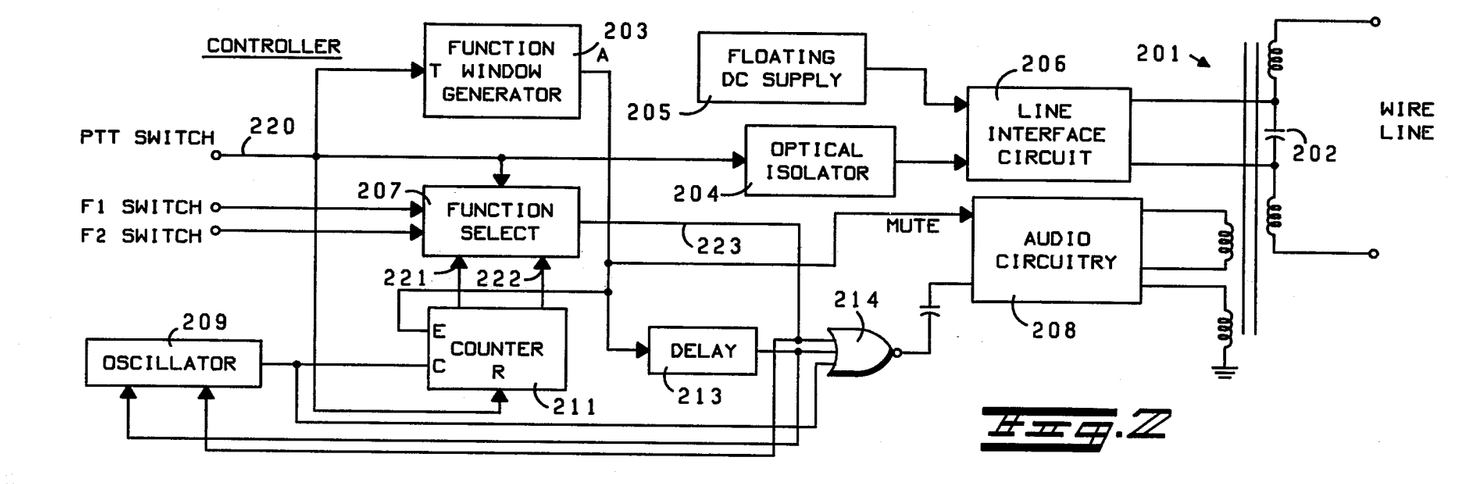
FIG. 2 shows a functional block diagram of the controller of the remote control stations shown in FIG. 1.

In FIG. 2 there is illustrated a functional block diagram of the controllers 101-105 of FIG. 1. The waveforms from selected blocks of FIG. 2 are illustrated in FIG. 3, where the waveforms are identified by the reference number of the corresponding block in FIG. 2. The transformer interface circuitry, generally designated 201, is a repeating-coil circuit of the type described at pages 9-11 of Chapter 2 of the book, "Basic Telephone Switching Systems," by David Talley, and published by the Hayden Book Company, Inc., 1969. The same basic transformer interface circuitry 201 is used in the decoder of the base station.

A message from a controller may be transmitted on a radio channel at RF frequency F1 or F2 depending on whether the F1 channel switch or the F2 channel switch is activated, respectively. Thus a message may be directed to a first group of mobile radios on the F1 radio channel or a second group of mobile radios on the F2 radio channel.

After activation of the F1 or F2 channel switch, transmission of a message from a controller to the mobile radios is initiated by an activation of the push-to-talk (PTT) switch 220. The transition of the PTT switch 220 triggers the function window generator 203, enables the optical isolator 204, enables the function select circuitry 207 and removes the reset from counter 211. In response to the PTT switch 220, the optical isolator 204 enables the line interface circuitry 206 to couple the floating DC supply 205 to the wire line. The line interface circuitry 206 is connected across the capacitor 202 of the transformer interface circuitry 201. When enabled by the optical isolator 204, the line interface circuitry 206 causes a predetermined voltage to be applied to the wire line. This voltage on the wire line indicates the initiation of a message to the base station.

The function window generator 203 is triggered by the low going transition of the PTT switch 20 and provides a low going pulse of a predetermined time interval. The function window generator 203 is connected to the audio circuitry 208 for muting the audio signals and to counter 211 for enabling the counter 211. The function window generator 203 is also connected to delay circuit 213 which delays by a predetermined time interval the application of the PTT switch 220 to the NOR gate 214 and the oscillator 209 in order to allow the base station sufficient time to detect the DC voltage on the wire line.

The low going output of the delay circuit 213 enables the oscillator 209. The clock signal from the oscillator 209 is connected to NOR gate 214 and to the clock input of the counter 211. The oscillator 209 provides the clock signal for counter 211 which provides a separate output signal for each consecutive state of the counter 211. Each consecutive state of the counter 211 may correspond to a channel switch or function switch. For example, a command pulse train having three pulses may be provided for the F1 channel switch, and a command pulse train having five pulses may be provided for the F2 channel switch. If the F1 channel switch is activated, the counter 211 counts three pulses of the clock signal and provides an output signal 221 for state three of the counter 211. Next, the function select circuitry 207 gates the F1 channel switch with the output signal 221 and provides a function select signal 223 that is applied to NOR gate 214 and oscillator 209 for holding the oscillator 209 reset. Similar operation is provided when the F2 channel switch in activated and the counter 211 provides output signal 222 corresponding to state five.

The NOR gate 214 gates the function select signal 223, the output of the delay circuit 213 and the clock signal from the oscillator 209 to provide the command pulse train, which is capactively coupled to the audio circuitry 208. In the preferred embodiment, the oscillator 209 provides a clock signal at a frequency of 300 Hz. Since the clock signal is within the audio bandwidth, the audio signals from audio circuitry 208 are muted by the function window generator 203. In addition, since the command pulse train is at a frequency of 300 Hz, the command pulse train may be AC coupled by the transformer interface circuitry 201 to the wire line.

The counter 211 of the preferred embodiment of the present invention may be any of a number of commercially available counters, such as the Motorola MC14017. The MC14017 is a decade counter that provides ten decoded outputs which may be used to provide for up to nine different channel or function switches. The tenth state or reset state of the counter 211 is the standby or quiescent state. Thus, provision can be readily made for many more channel or function switches simply by increasing the capacity of the counter 211.

Figure 4:
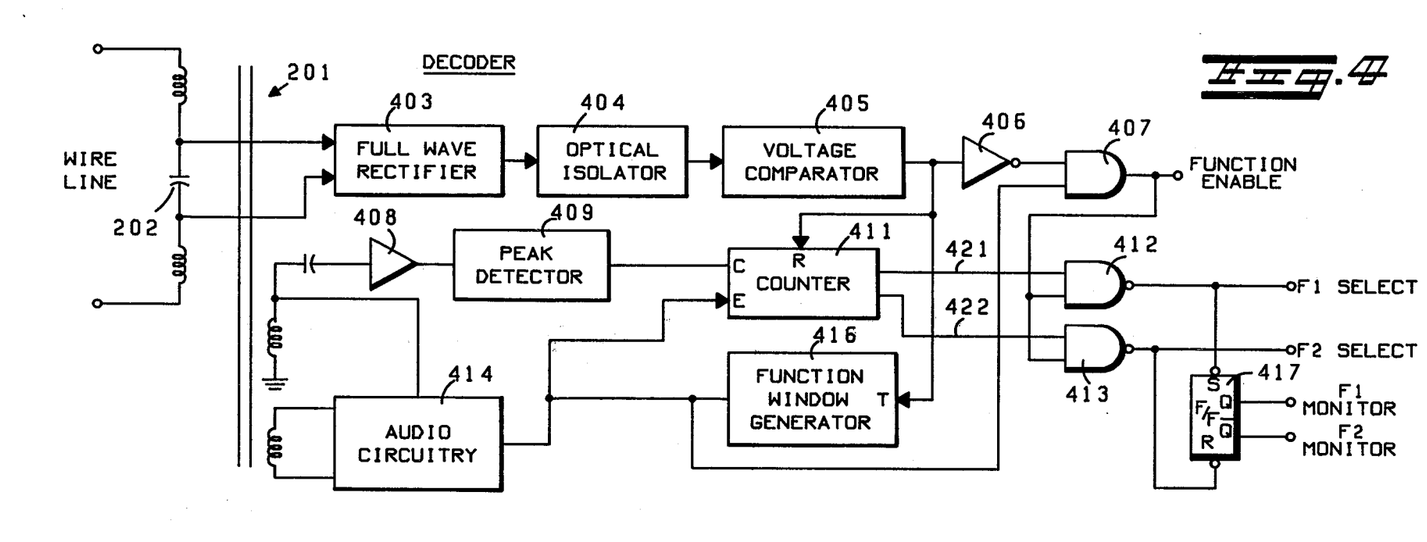
FIG. 4 shows a functional block diagram of the decoder of the base station shown in FIG. 1.
Figure 5:
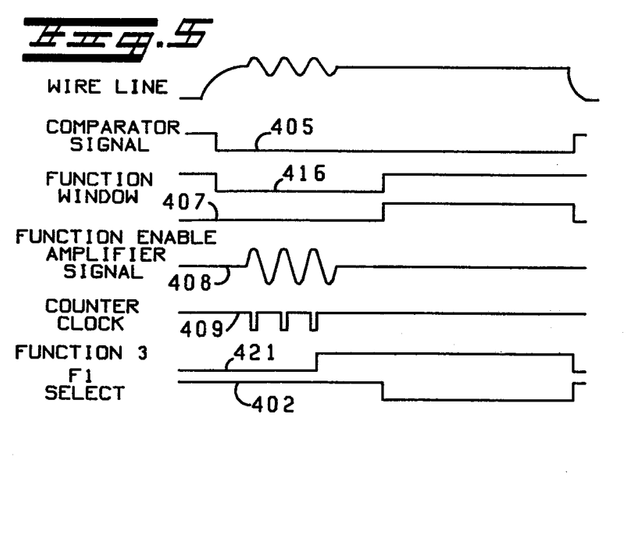
FIG. 5 shows a timing diagram of waveforms for corresponding blocks of the decoder of FIG. 4.

The decoder 115 of FIG. 1 is shown in more detail by the functional block diagram of FIG. 4. The waveforms from selected blocks of FIG. 4 are illustrated in FIG. 5, where the waveforms are identified by the reference number of the corresponding block in FIG. 4. A full-wave rectifier 403 is connected to the capacitor 202 of the transformer interface circuitry 201 for uni-directionally applying the voltage on the wire line to the optical isolator 404. The optical isolator 404 detects the full-wave rectified voltage and provides an output signal to the voltage comparator 405. The voltage comparator 405 is responsive to the optical isolator 404 for providing a logical zero output when the detected voltage is greater than a predetermined voltage. The output from the voltage comparator 405 is applied to inverter 406, the reset input of counter 411 and the trigger input of function window generator 416.

The command pulse train on the two-wire line is AC coupled by the transformer interface circuitry 201 to amplifier 408. The peak detector 409 is responsive to the amplified command pulse train for converting the amplified command pulse train to negative going pulses, which are applied to the clock input of counter 411. Each pulse of the command pulse train is coded as one full period of the 300 Hz clock signal from the oscillator of the controller of FIG. 2. Thus the peak detector 409, detects the positive going portion of the pulses of the command pulse train.

The function window generator 416, having been triggered by low going edge of the output from the voltage comparator 405, provides a low going pulse of a predetermined time interval. The pulse from the function window generator 416 must be of sufficient duration to include the longest command pulse train. The pulse from the function window generator 416 is applied to the enable input of counter 411 and to the audio circuitry 414 for muting the audio signals. The counter 411 is enabled by the pulse from the function window generator 416 to count the number of pulses in the received command pulse train. The pulse from the function window generator 416 is also applied to AND gate 407 for disabling NAND gates 412 and 413 during the time in which counter 411 is totalizing the pulses of the received command pulse train.

The counter 411 may provide a plurality of outputs corresponding to the various possible totalized number of pulses in the received command pulse train. For example, an output signal 421 from the counter 411 corresponding to a total of three pulses may be applied to NAND gate 412 for selecting a radio channel at frequency F1. Likewise, an output signal 422 corresponding to a total of five pulses may be applied to NAND gate 413 for selecting a radio channel at frequency F2. The counter 411 may be any of a number of commercially available counters, such as the Motorola MC14017 which provides ten decoded outputs.

When the pulse from the function window generator 416 times out, AND gate 407 enables NAND gates 412 and 413. Then, as in the previous example, if a total of three pulses has been received, NAND gate 412 provides a logical zero output for selecting the radio channel at frequency F1. In addition to selecting the radio channel at frequency F1, NAND gate 412 is connected to the set input of flip-flop 417 for enabling the base station to monitor the F1 radio channel. NAND gate 412 selects the F1 radio channel as long as DC voltage remains on the wire line. For a simplex radio system, the F1 radio channel is enabled as long as the transmission switch is activated. When the transmission switch is deactivated, the DC voltage is removed from the wire line, and the flip-flop 217 remains in the set state so as to enable the monitoring of the F1 radio channel. Thus, a message is transmitted to the mobile radios on the F1 radio channel while the transmission switch is activated, and thereafter the F1 radio channel is monitored for messages from the mobile radios. Similar operation is provided when NAND gate 413 enables the F2 radio channel. However, in the preferred embodiment, only one radio channel, either the F1 or the F2 radio channel is selected at any one time.

Figure 6:
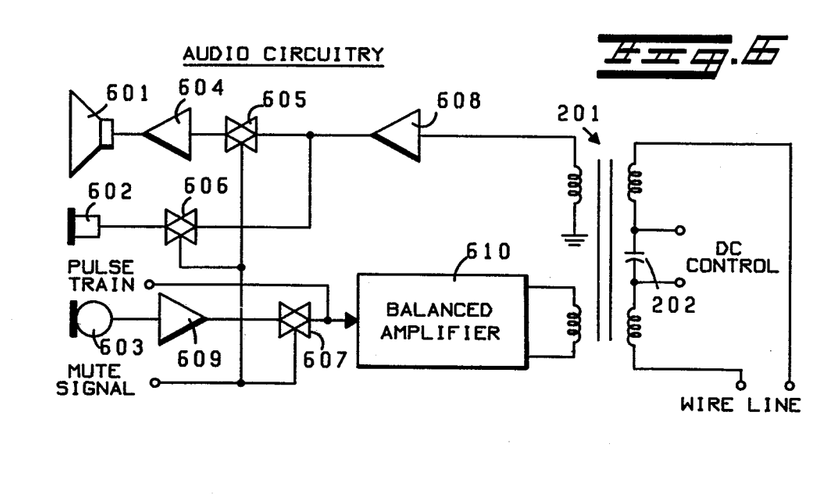
FIG. 6 shows a functional block diagram of the audio circuitry blocks of FIGS. 2 and 4.

In FIG. 6, there is illustrated a functional block diagram of the audio circuitry blocks of FIGS. 2 and 4. Audio signals from the wire line are AC coupled by the transformer interface circuitry 201 to the amplifier 608. The amplified audio signals from amplifier 608 are connected by way of audio switch 605 to amplifier 604 for application to speaker 601, and by way of audio switch 606 for application to the earpiece speaker 602 of an operator's handset. In response to the mute signal, the audio switches 605 and 606 are opened to prevent the amplified audio signals from reaching the speaker 601 and earpiece speaker 602.

Audio signals from the mouthpiece transmitter 603 which is located together with the earpiece speaker 602 in the operator's handset, is connected to amplifier 609. The amplified audio signals from amplifier 609 are connected by way of audio switch 607 to the balanced amplifier 610 for application to the transformer interface circuitry 201. The balanced amplifier 610 not only provides amplification but also provides impedance matching to the transformer interface circuitry 201. The amplified audio signals from the balanced amplifier 610 are coupled by way of the transformer interface circuitry 201 to the wire line. Similarly, in response to the mute signal, audio switch 607 is opened so that the command pulse train may be applied to the balanced amplifier 610.

In the base station, the audio circuitry is connected to the base-station radio instead of the earpiece speaker 602 and the mouthpiece transmitter 603. The speaker 601 may also be eliminated at the base station. The audio signals from audio switch 606 are coupled to the base-station transmitter, and audio signals from the base station receiver are coupled to the amplifier 609.

Figure 7:
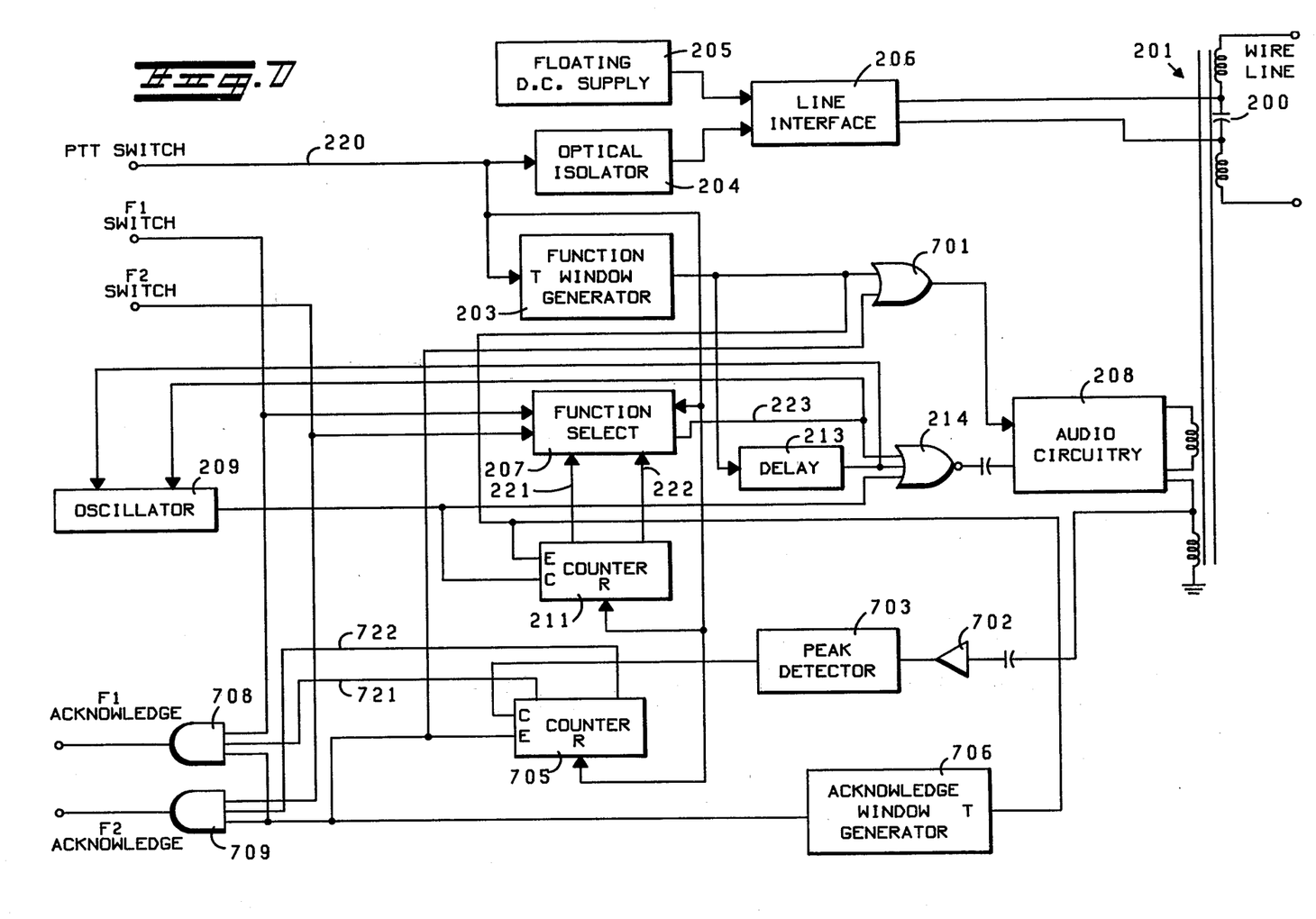
FIG. 7 shows a functional block diagram of a controller which embodies an acknowledge signalling feature.

In FIG. 7, there is illustrated a remote controller similar to the controller of FIG. 2 with the addition of further circuitry for receiving an acknowledge pulse train from the base station. Like reference numbers are assigned to blocks of FIG. 7 which correspond to blocks of FIG. 2. An activation of the PTT switch 220 results in identical operation to that described for FIG. 2 hereinabove. However, when the pulse of the function window generator 207 times out, the acknowledge window generator 706 is triggered. The acknowledge window generator 706 provides a predetermined time interval during which an acknowledge pulse train from the base station must be received.

The acknowledge pulse train is capacitively coupled from the transformer interface circuitry 201 to amplifier 702 and thereafter to peak detector 703. The pulses of the acknowledge pulse train from the peak detector 703 are applied to the clock input of counter 705. The counter 705, being enabled to count by the acknowledge window generator 706, totalizes the pulses of the acknowledge pulse train and provides output signals indicative of the totalized number of pulses. The counter output signals 721 and 722, indicative of 3 pulses and 5 pulses, respectively, are applied to AND gates 708 and 709. AND gate 708 provides an F1 acknowledge indication when the F1 channel switch is activated, output signal 721 indicative of three pulses is provided by counter 705 and the acknowledge window generator 706 has timed out.

Similarly, the AND gate 709 provides an F2 acknowledge indication when the F2 channel switch is activated, output signal 722 indicative of five pulses is provided by counter 705 and the acknowledge window generator 706 has timed out. Additional radio channels and functions can be easily added simply by providing additional switches and increasing the capacity of the counters 211 and 705 to provide the necessary additional outputs.

The acknowledge feature provides the operator of the remote controller with positive feedback as to the particular radio channel that he is in fact utilizing. In the case that the acknowledge indication does not agree with the switch that has been activated, the operator may terminate his message and repeat the operation again. This is a very important feature for a remote control system where one desires to selectively communicate with a particular group of mobile radios.

In FIG. 8, there is illustrated a decoder similar to the decoder of FIG. 4 with the addition of the capability of providing an acknowledge pulse train. Like reference numbers are assigned to blocks of FIG. 8 which correspond to blocks of FIG. 4. The operation of the decoder of FIG. 8 is similar to the operation of the decoder of FIG. 4 described hereinabove, with the exception that an acknowledge pulse train is provided immediately after receiving a command pulse train.

The acknowledge window generator 802 is triggered when the pulse from the function window generator 416 times out. The acknowledge window generator 802 provides a predetermined time interval during which an acknowledge pulse train having the same number of pulses as the received command pulse train is transmitted to the remote controller.

The oscillator 804 is enabled, after the predetermined delay provided by the delay circuitry 808, to provide a clock signal to the clock input of counter 806. The counter 806, having been enabled by the acknowledge window generator 802, totalizes the clock signal pulses until an output signal 823 is provided by the function select circuitry 803. The function select circuitry 803 gates the particular channel select output from NAND gates 412 and 413 with corresponding output signals 821 and 822, respectfully, from the counter 806. Thus, if the F1 radio channel is selected by NAND gate 412, the function select circuitry 803 provides output signal 823 when output signal 821 goes high indicating that three pulses of the clock signal have been totalized. Similar operation is provided when the F2 radio channel is selected by NAND gate 413 and output signal 822 goes high indicating the five pulses of the clock signal have been totalized.

The acknowledge pulse train is formed by NOR gate 809 and is capacitively coupled to the audio circuitry 414 for application to the wire line by transformer interface circuitry 201.

The base station provides an acknowledge pulse train corresponding to the particular radio channel selected by each command pulse train received from the remote controller. Thus, if noise has interfered with the reception of the command pulse train, the malfunction may be detected by an operator at the remote controller since the acknowledge indication will not correspond to the radio channel or function selected. Furthermore, additional circuitry may be added to automatically terminate a message when the acknowledge indication does not correspond to the transmitter or function selected. A remote control system equipped with the acknowledge signalling feature of the present invention provides for secure and reliable operation of a base station with relatively inexpensive circuitry.

The foregoing embodiments have been intended as illustrations of the principles of the present invention. Accordingly, other modifications, uses and embodiments can be devised by those skilled in the art without departing from the spirit and scope of the principles of the present invention.

What is claimed is:

1. In a remote control system including at least one control station connected via a wire line, having a predetermined audio frequency passband, to a base station having at least one transmitter operable on a plurality of radio channels, the control station sending messages over selected base-station radio channels, said remote control system including improvement comprising:
    (a) the control stations including:
        (i) a transmission switch, said transmission switch being activated for sending each message;
        (ii) a plurality of channel switches, each channel switch corresponding to a pre-established base station radio channel, a selected channel switch being activated for each message;
        (iii) pulse generating means responsive to the selected channel switch and each activation of said transmission switch for providing a command pulse train having a different predetermined number of consecutive pulses corresponding to each selected channel switch; said pulse generating means including oscillator means responsive to each activation of the transmission switch for providing a clock signal having a predetermined frequency within the predetermined audio passband of the wire line, counting means responsive to each activation of the transmission switch for totalizing the pulses of the clock signal and providing an output signal when the totalized number of pulses is the same as the predetermined number of pulses for the selected channel switch; and gating means coupled to the clock signal and counting means output signal for providing the command pulse train, wherein each cycle interval of the clock signal corresponds to a pulse of the command pulse train; and
        (iv) first wire-line interface means responsive to each activation of said transmission switch for applying a DC voltage to the wire line and thereafter AC coupling the command pulse train from said pulse generating means to the wire line, said AC coupled command pulse train having a peak to peak voltage magnitude that is less than the DC voltage magnitude; and
    (b) the base station including:
        (i) second wire-line interface means for sensing the DC voltage on, and receiving the command pulse train from, the wire line;
        (ii) counting means for totalizing the number of pulses of the received command pulse train; and
        (iii) control means for enabling the base station to transmit the message on the radio channel corresponding to the totalized number of pulses of the received command pulse train.

2. The remote control system according to claim 1, wherein the control station includes delay means interposed between the pulse generating means and the transmission switch for delaying the response of the pulse generating means to each activation of the transmission switch by a predetermined time interval.

3. The remote control system according to claim 2, wherein the control station further includes function window generating means responsive to each activation of the transmission switch for providing a function window signal for muting the message during the time interval of the delay means and the time interval of the command pulse train.

4. The remote control system according to claim 1, wherein the base station includes function window generating means responsive to the second DC voltage for providing a function window signal having a predetermined time interval, the function window signal coupled to the counting means for enabling the counting means to totalize during the predetermined time interval.

5. The remote control system according to claim 1, wherein the predetermined frequency of the command pulse train is at least three hundred Hertz.

6. The remote control system according to claim 1 wherein the first wire-line interface means includes means for optically applying the DC voltage to the two-wire line.

7. The remote control system according to claim 1, wherein said control means subsequently enables the base station to terminate the transmitting of the message when the absence of the DC voltage on the wire line is sensed by the second wire-line interface means.

8. The remote control system according to claim 1, wherein said control means enables the base station to monitor the radio channel corresponding to the totalized number of pulses of the received command pulse train.

9. The remote control system according to claim 8, wherein said control means includes storage means for storing an indication signal corresponding to the monitored radio channel, the control means enabling the base station to monitor the radio channel corresponding to the control indication signal after termination of the message.

10. In a remote control system including a plurality of control stations connected via a wire line, having a predetermined audio frequency passband, to a base station having at least one transmitter operable on a plurality of ratio channels, the control stations sending messages over selected base-station radio channels, said remote control system including improvement comprising:
(a) each control station including:
(i) a transmission switch, said transmission switch being activated for sending each message;
(ii) a plurality of channel switches, each channel switch corresponding to a pre-established base-station radio channel, a selected channel switch being activated for each message;
(iii) pulse generating means responsive to the selected channel switch and each activation of said transmission switch for providing a command pulse train having a different predetermined number of consecutive pulses corresponding to each selected channel switch; said pulse generating means including oscillator means responsive to each activation of the transmission switch for providing a clock signal having a predetermined frequency within the predetermined audio passband of the wire lines, counting means responsive to each activation of the transmission switch for totalizing the pulses of the clock signal and providing an output signal when the totalized number of pulses is the same as the predetermined number of pulses for the selected channel switch; and gating means coupled to the clock signal and counting means output signal for providing the command pulse train, wherein each cycle interval of the clock signal corresponds to a pulse of the command pulse train; and
(iv) first wire-line interface means responsive to each activation of said transmission switch for applying a DC voltage to the wire line and thereafter AC coupling the command pulse train from said pulse generating means to the wire line, said AC coupled command pulse train having a peak to peak voltage magnitude that is less than the DC voltage magnitude; and
(b) the base station including:
(i) second wire-line interface means for sensing the DC voltage on, and receiving the command pulse train from, the wire line;
(ii) function window generating means responsive to the sensed DC voltage for providing a function window signal having a predetermined time interval;
(iii) counting means responsive to the function window signal for totalizing the number of pulses of the received command pulse train occurring during the predetermined time interval of the function window signal; and
(iv) control means responsive to the termination of the function window signal for enabling the base station to transmit the message on the radio channel corresponding to the totalized number of pulses of the received command pulse train.

11. The remote control system according to claim 10, wherein each base station further includes:
pulse generating means responsive to the totalized number of pulses of the received command pulse train for providing an acknowledge pulse train having the same number of pulses as the totalized number of pulses of the received command pulse train; and
third wire-line interface means for AC coupling the acknowledge pulse train to the wire line, said AC coupled acknowledge pulse train having a peak to peak voltage magnitude that is less than the DC voltage magnitude; and
each control station further including:
acknowledge window generating means responsive to the pulse generating means of the control station for providing an acknowledge window signal having a predetermined time interval from the last pulse of the command pulse train;
fourth wire-line interface means for receiving the acknowledge pulse train from the wire line;
counting means responsive to the acknowledge window signal for totalizing the number of pulses of the acknowledge pulse train occurring during the predetermined time interval of the acknowledge window signal; and
comparing means for comparing the totalized number of pulses of the acknowledge pulse train to the predetermined number of pulses for the selected channel switch and providing an acknowledge indication when the totalized number of pulses of the acknowledge pulse train is the same as the predetermined number of pulses for the selected channel switch.

12. In a remote control system including a plurality of control stations connected via a wire line, having a predetermined audio frequency passband, to a base station having at least one transmitter operable on a plurality of radio channels, the control stations sending messages over selected base-station radio channels, said remote control system including improvement comprising:

(a) each control station including:
  (i) a transmission switch, said transmission switch being activated for sending each message;
  (ii) a plurality of channel switches, each channel switch corresponding to a pre-established base-station radio channel, a selected channel switch being activated for each message;
  (iii) pulse generating means responsive to the selected channel switch and each activation of said transmission switch for providing a command pulse train having a different predetermined number of consecutive pulses corresponding to each selected channel switch; said pulse generating means including oscillator means responsive to each activation of the transmission switch for providing a clock signal having a predetermined frequency within the predetermined audio passband of the wire line, counting means responsive to each activation of the transmission switch for totalizing the pulses of the clock signal and providing an output signal when the totalized number of pulses is the same as the predetermined number of pulses for the selected channel switch; and gating means coupled to the clock signal and counting means output signal for providing the command pulse train, wherein each cycle interval of the clock signal corresponds to a pulse of the command pulse train; and
  (iv) delay means interposed between the pulse generating means and the transmission switch for delaying the response of the pulse generating means to each activation of the transmission switch by a predetermined time interval;
  (v) first wire-line interface means responsive to each activation of the transmission switch for applying a predetermined DC voltage to the wire line and thereafter AC coupling the delayed command pulse train from said pulse generating means to the wire line, said AC coupled command pulse train having a peak to peak voltage magnitude that is less than the DC voltage magnitude; and (b) the base station including:
  (i) second wire-line interface means for sensing the DC voltage on, and receiving the command pulse train from, the wire line;
  (ii) function window generating means responsive to the sensed DC voltage for providing a function window signal having a predetermined time interval;
  (iii) counting means responsive to the function window signal for totalizing the number of pulses of the received command pulse train occurring during the predetermined time interval of the function window signal; and
  (iv) control means responsive to the termination of the function window signal for enabling the base station to transmit the message on the radio channel corresponding to the totalized number of pulses of the received command pulse train, the control means subsequently disabling the base station from transmitting when the absence of the DC voltage on the wire line is sensed by the second wire-line interface means.

13. The remote control system according to claim 12, for use with a plurality of mobile radios, wherein a control station sends a message to mobile radios tuned to the base-station radio channel on which the message is being transmitted.

* * * * *

UNITED STATES PATENT AND TRADEMARK OFFICE
CERTIFICATE OF CORRECTION

PATENT NO. : 4,208,631

DATED : June 17, 1980

INVENTOR(S) : Kermit M. Beseke, James E. Hoffman & Ronald J. Kopecki

It is certified that error appears in the above-identified patent and that said Letters Patent are hereby corrected as shown below:

Column 4, line 34, "in" should be -- is --.

Column 9, line 38, "control" should be -- stored --.

Column 9, line 44, "ratio" shoud be -- radio --.

Signed and Sealed this

Twenty-eighth Day of October 1980

[SEAL]

Attest:

SIDNEY A. DIAMOND

Attesting Officer

Commissioner of Patents and Trademarks